United States Patent

Janssen

[15] 3,673,321

[45] June 27, 1972

[54] TELEVISION RECIEVER WITH A PHASE DETECTOR HAVING DUAL PHASE DETERMINING AND CORRECTING NETWORKS

[72] Inventor: Peter Johannes Hubertus Janssen, Emmasingel Eindhoven, Netherlands

[73] Assignee: U.S. Philips Corporation, New York, N.Y.

[22] Filed: March 27, 1970

[21] Appl. No.: 23,335

[30] Foreign Application Priority Data

April 1, 1969 Netherlands..........................6905094

[52] U.S. Cl.........................178/5.8 A, 178/5.8 AF, 325/420

[51] Int. Cl...........................................................H04n 5/50

[58] Field of Search..............................178/5.8 A, 5.6, 5.8 F; 325/420

[56] References Cited

UNITED STATES PATENTS

| | | | |
|---|---|---|---|
| 3,375,325 | 3/1968 | Janssen | 178/5.8 A |
| 2,880,269 | 3/1959 | Dome | 178/5.8 A |
| 2,953,637 | 9/1960 | Baugh | 178/5.8 A |
| 3,281,698 | 10/1966 | Rose et al. | 325/420 |

*Primary Examiner*—Robert L. Griffin
*Assistant Examiner*—Richard P. Lange
*Attorney*—Frank R. Trifari

[57] ABSTRACT

An automatic frequency control circuit in a television receiver wherein an intercarrier signal is applied to each of two inputs of a phase detector, which intercarrier signals originates from two intermediate frequency signal paths which differ in that one of them includes a phase-determining network, while a phase correction circuit is incorporated in the signal path to one of the inputs of the phase detector so as to avoid variations at audio frequency in the output signal of the phase detector, which output signal serves as a control signal.

7 Claims, 1 Drawing Figure

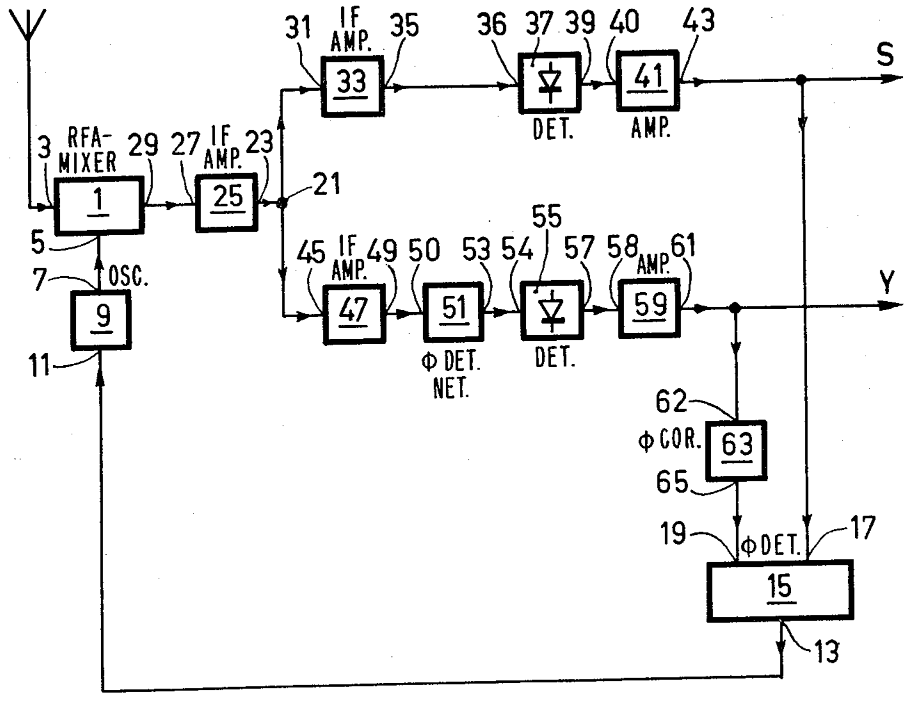
INVENTOR.
PETER J.H.JANSSEN
BY
AGENT

TELEVISION RECIEVER WITH A PHASE DETECTOR HAVING DUAL PHASE DETERMINING AND CORRECTING NETWORKS

The invention relates to a television receiver including at least an intermediate frequency amplifier and an automatic control circuit, which television receiver is suitable for the reception of a first, amplitude-modulated carrier and a second frequency-modulated carrier each of which comprises a different kind of information, said automatic control circuit including a signal path splitting in the intermediate frequency amplifier, said intermediate frequency amplifier after the signal path splitting having a first signal path which includes at least a first intercarrier detector, and a second signal path which includes at least a phase-determining network tuned to the frequency-modulated intermediate frequency carrier and a second intercarrier detector, an output of each of the said intercarrier detectors being coupled to a different input of a phase detector which phase detector has a control signal output which is coupled to a control signal input of a section of the television receiver to be controlled.

Such a television receiver including a control circuit is known from the U.S. Pat. No. 3,375,325 wherein the section of the television receiver to be controlled is an oscillator of a mixer stage to be controlled in frequency. Furthermore the phase-determining network is the sound intermediate frequency suppression filter which serves for the suppression of the frequency-modulated intermediate frequency sound carrier in the picture channel. In such circuits amplitude variations of audio frequency are found to occur in the output signal of the phase detector such that a strong filtering of this output signal is required. For this filtering it is found to be difficult to find a favorable compromise between a sufficiently quick action of the control loop and a sufficient smoothing of the control signal.

The object of the invention is to make easily realizable such a compromise.

To this end a television receiver of the kind described in the preamble according to the invention is characterized in that a phase correction circuit is incorporated in at least one of the couplings between an output of one of the said intercarrier detectors and the corresponding input of the phase detector.

The invention is based on the recognition of the fact that in the said connections between the outputs of the intercarrier detectors and the inputs of the phase detector the central frequency of the intercarrier signal remains equal when the central intermediate frequency of the second carrier varies as a result of a detuning of the oscillator. For in that case the intermediate frequency of the first carrier varies to the same extent and the central frequency of the intercarrier signal which is the difference between the central intermediate frequencies of the first and second carriers, remains equal independent of the oscillator detuning. A phase-correction circuit in one of the said connections cannot therefore exert influence on the phase of the signal of the central intercarrier frequency as a function of the oscillator frequency. Consequently, the desired action of the phase detector is not influenced, for this phase detector must determine the phase difference which is produced in the second signal path relative to the phase of the second carrier conveyed by the first signal path as a result of a detuning of the oscillator when the second carrier in the phase-determining network deviates from the desired central intermediate frequency. On the other hand signals having a frequency deviating from the central intercarrier frequency undergo a phase shift in the phase correction circuit. Phase shifts produced by the frequency modulation of the second carrier, which must pass through the phase-determining network, can therefore be corrected with the aid of the phase correction circuit. This phase correction circuit causes a counteracting phase shift at the relevant input of the phase detector which phase shift is produced by the frequency modulation of the intercarrier signal passed through said phase correction circuit. The circuit may be proportioned in a simple manner such that as a result of the said frequency modulation substantially no output voltage variation is produced at the control signal output of the phase detector. A smoothing of the output voltage of the phase detector can therefore become substantially superfluous so that a very fast control action can be obtained.

In order that the invention may be readily carried into effect, an embodiment thereof will now be described in detail by way of example with reference to the accompanying diagrammatic drawing which comprises only one FIGURE.

The drawing illustrates by way of a non-detailed block diagram an embodiment of part of a television receiver according to the invention which is important for the understanding of the invention.

In the drawing an RF and mixing section 1 has an input 3 to which a received television signal may be applied. An input 5 of the RF and mixing section 1 is connected to an output 7 of an oscillator 9. The oscillator 9 has a control signal input 11 which is connected to an output 13 of a phase detector 15. The phase detector 15 has two inputs 17 and 19 which are each connected through a different signal path to a signal path splitting 21.

The signal path splitting 21 is provided at an output 23 of a first intermediate frequency amplifier 25 an input 27 of which is connected to an output 29 of the RF and mixing section 1. An intermediate frequency signal obtained from the RF and mixing section 1 is applied from this output 29 through the first IF amplifier 25 to the signal path splitting circuit 21 when an RF television signal is received at the input 3.

The signal path from the signal path splitting circuit 21 to the input 17 of the phase detector 15 is referred to herein as the first signal path and successively includes a second IF amplifier 33, a first intercarrier detector 37 and a first intercarrier amplifier 41. An input 31 of the second IF amplifier 33 is connected to the signal path splitting circuit 21 and an output 35 is connected to an input 36 of the first intercarrier detector 37. An output 39 of this first intercarrier detector 37 is connected to an input 40 of the first intercarrier amplifier 41. An output 43 of this first intercarrier amplifier 41 is connected to the input 17 of the phase detector 15 and is furthermore connected to the rest of the television receiver not shown so as to provide, for example, an intercarrier signal S from which a sound signal may be obtained by means of detection.

The signal path from the signal path splitting circuit 21 to the input 19 of the phase detector 15 is referred to as the second signal path and successively includes a third IF amplifier 47, a phase-determining network 51, a second intercarrier detector 55, a second intercarrier amplifier 59 and a phase correction circuit 63 according to the invention. An input 45 of the third IF amplifier 47 is connected to the signal path splitting 21 and an output 49 is connected to an input 30 of the phase-determining network 51. An output 53 of the phase-determining network 51 is connected to an input 54 of the second intercarrier detector 55. An input 58 of the second intercarrier amplifier 59 is connected to an output 57 of the second intercarrier detector 55 and an output 61 is connected to an input 62 of the phase correction circuit 63. The output 61 is furthermore connected to a section of the receiver not shown for, providing, for example, a video signal Y to the rest of the television receiver. The phase-determining network 51 may at the same time serve as an IF sound carrier suppression filter for a video signal derived from the output 61. An output 65 of the phase correction circuit 63 is connected to the input 19 of the phase detector 15.

In so far as the operation of the circuit arrangement is important for the understanding of the invention, it will now further be described.

When a television signal is received at the input 3 of the RF and mixing section 1, an IF signal comprising a first carrier, for example, the picture carrier, and a second carrier appears at the IF signal path splitting 21. This second carrier is frequency-modulated and is generally the sound carrier. The frequencies of these carriers are dependent on the tuning of the oscillator 9. However, the frequency difference between the first and the second carrier remains equal because this is laid down at the transmission side. The picture carrier is applied at substantially the same phase from the signal path splitting 21 through the two mentioned signal paths to the two intercarrier detectors 37 and 55. The sound carrier is also applied to the two intercarrier detectors 37 and 55, but at a phase difference which is mainly determined by the phase-determining network 51. In the vicinity of the desired sound intermediate frequency the phase-determining network 51 has a greatly sloping phase characteristic. As a result the sound intermediate frequency signals at the intercarrier detectors 37 and 55 have a phase difference dependent on their frequency. This phase difference likewise becomes manifest in intercarrier components in the output signals of these intercarrier detectors 37 and 55, which have the difference frequency between the picture carrier and the sound carrier. The intercarrier signals at the outputs 39 and 57 of the intercarrier detectors 37 and 55, respectively, thus show a phase difference which mainly depends on the intermediate frequency of the sound carrier passed through the phase-determining network 51. The frequency modulation of the sound carrier will thus also cause a variation of this phase difference with the sound frequency.

The output signal of the intercarrier detector 37 is applied through the first intercarrier amplifier 41 to the input 17 and the output signal of the intercarrier detector 55 is applied through the second intercarrier amplifier 59 and the phase correction circuit 63 to the input 19 of the phase detector 15.

The phase correction circuit 63 counteracts the phase variations of sound frequency caused by the phase-determining network 51. A signal which does not show substantially any phase variations of sound frequency in case of a correct proportioning of the phase correction circuit 63 then appears at the output 65 of the phase correction circuit 63 and hence at the input 19 of the phase detector 15. The frequency of the unmodulated intercarrier remains independent of the tuning of the oscillator 9 so that the signals of the central intercarrier frequency in the phase compensation circuit acquire a phase shift in the phase correction circuit 63 which is independent of said tuning and hence of the sound carrier intermediate frequency.

As a result intercarrier signals are supplied to the inputs 17 and 19 of the phase detector 15 in which signals the phase difference is substantially the same at any frequency of said intercarrier signals and is only dependent on the intermediate frequency of the sound carrier which is passed through the phase-determining network 51. This phase difference is detected in the phase detector 15 and is converted into a control voltage which becomes available at the output 13 thereof and which recontrols the frequency of the oscillator 9 through the control signal input 11 of the oscillator 9 until the sound carrier in the IF signal has the desired frequency. The control voltage at the output 13 may of course be used for other purposes such as, for example, for varying the IF or video frequency response characteristic of the receiver or for detuning the phase-determining network 51 itself.

As was stated above, the phase correction circuit 63 must generate phase variations from sound frequency variations in the intercarrier signal which are opposed to the phase variations produced in the phase-determining network 51 as a result of the frequency variations due to the modulation of the IF sound carriers. The phase correction circuit 63 must therefore have a phase characteristic which is opposite to that of the phase-determining network 51. The phase correction circuit 63 is therefore preferably formed by a network which is composed dually with the phase-determining network 51. Thus, at the position when the phase-determining network 51 has a series resonance circuit, the phase correction circuit 63 must have a parallel resonance circuit at the corresponding positions. Such a combination then also provides a correction of the amplitude characteristic in the second signal path to the input 19 of the phase detector 15. The relative frequency sweep in the intercarrier signal is a factor of A greater than that in the IF signal wherein A is the ratio between the sound intermediate frequency and the intercarrier frequency. The slope of the relative phase characteristic of the network in the phase correction circuit 63 will thus have to be preferably a factor of A smoother than that of the other dual phase-determining network 51. The quality factor Q of the network in the phase correction circuit 63 will then have to be a factor of A smaller than that of the phase-determining network 51.

It will be evident that the same object can be achieved by using instead of the phase correction circuit 63 given in this embodiment, a circuit which is analogous to the phase determining network 51 and which is provided in the connection from the output 39 of the first intercarrier detector 37 to the input 17 of the phase detector 15, or with suitable phase correction circuits in each of the input paths of the phase detector. The amplitudes of the signals which are applied to the inputs 17 and 19 of the phase detector 15 will, however, be more favorable in the embodiment described.

Any phase correction circuit which performs the above-described function in the circuit shown is of course considered to be within the scope of the present invention.

Amplitude variations in the control signal at the output 13 of the phase detector 15 as a result of the frequency modulation of the sound intermediate frequency signal can be avoided by means of the step according to the invention to such an extent that a smoothing network having an extremely short time constant for this control signal will be sufficient so that an exceptionally fast-acting control system can be obtained.

What is claimed is:

1. A signal receiver of the type adapted to receive a composite signal including a first signal component modulated on a carrier wave and a second signal component frequency modulated on a subcarrier wave, said receiver comprising first and second signal paths, means for applying said composite signal to said first and second paths, first detector means in said first path for producing a first output signal at the subcarrier frequency, a phase determining network in said second path, said phase determining network producing first phase variations of the modulated subcarrier wave in said path as determined by departures of the central frequency of said subcarrier wave from an assigned value and second phase variations of said modulated subcarrier wave as determined by frequency modulations of said subcarrier wave, second detector means in said second path coupled to the output of said phase determining network for producing a second output signal at the subcarrier frequency having composite phase variations as determined by the phase variations produced by said phase determining network, phase detecting means coupled to the outputs of said detecting means for producing an output signal, and a phase correction circuit interposed between the output of one of said detector means and said phase detecting means, said phase correction means comprising means for generating phase variations of the subcarrier signal applied thereto as determined by the frequency variation of the said subcarrier signal about its nominal value, said phase variations being in a sense opposite to the said second phase variations imparted to said subcarrier wave by said phase determining network thereby to produce an output signal having a value as determined by said first variations of said modulated subcarrier wave.

2. A circuit as claimed in claim 1 wherein said phase correction circuit is coupled between said second detector and said phase detector.

3. A circuit as claimed in claim 2 wherein said phase correction circuit comprises the dual of said phase determining network.

4. A circuit as claimed in claim 2 wherein said phase correction circuit has a relative frequency-phase characteristic which is substantially as many times broader than the relative frequency-phase characteriatic of said phase-determining network as is the ratio between said intermediate frequency of the frequency-modulated carrier and said intercarrier frequency.

5. A circuit as claimed in claim 4, wherein said phase-determining network and said phase correction circuit comprise filters which are duals of each other, the quality factor ratio of said filters being substantially equal to the ratio between the intermediate frequency of the frequency-modulated carrier and the intercarrier frequency.

6. A circuit as claimed in claim 3 wherein said phase determining network comprises a series resonant circuit and said phase correction network comprises a parallel resonant circuit.

7. A circuit as claimed in claim 1 wherein said automatic control terminal comprises an automatic frequency control terminal.

* * * * *